INVENTOR.
VIRGIL W. WALL

BY

ATTORNEY

United States Patent Office 3,219,920
Patented Nov. 23, 1965

3,219,920
TRANSDUCER EMPLOYING A GUARD RING BETWEEN INPUT AND OUTPUT MEANS TO REDUCE STRAY CAPACITANCES
Virgil W. Wall, Encino, Calif., assignor to Whittaker Corporation, a corporation of California
Filed Apr. 5, 1961, Ser. No. 100,973
5 Claims. (Cl. 323—122)

This invention relates to shielding means for reducing or eliminating spurious capacitative or electrostatic coupling between the input and output element of phase-shifting capacitors by means of guard ring conductors. More particularly, this invention relates to improvements in precision measuring devices of the type described in copending applications Serial No. 694,044, filed November 1, 1957, now Patent No. 3,068,457, and Serial No. 121,852, filed July 5, 1961, now Patent No. 3,125,716, both of which are assigned to the same assignee as the present application.

The aforementioned precision measuring devices depend for their operation upon capacitive or electrostatic coupling between input and output conductor elements, both of which are carried on a fixed stator, in accordance with the variable coupling effect of coupler conductor bars on a relatively movable rotor. Relative movement between stator and rotor generates a displacement current which is sampled at various points. For reasons explained in the above-referenced applications, the electrostaticaly induced voltage in the output elements is a small fraction of the voltage imposed on the input elements. At the same time, the input and output conductors of the stator, which oppose the coupler bars across the narrow gap between rotor and stator, constitutes a substantial distributed capacitance. At the high frequency used in the signal transmission circuitry of this device, the stray capacitive coupling between the input and output conductor patterns in the stator becomes correspondingly large; that is, the capacitive voltage appearing in the output, other than that provided via movable coupler bars, becomes substantial. As a result of the small signal voltage and of the high direct stray capacitive coupling, the variable signal components of the output voltage may be of such a size as to mask the signal voltage. Furthermore, the magnitude of the spurious signal varies with the relative position of the rotor and stator. This effect is to render difficult the determination of the rotor function current accurately.

The present invention is directed to the improvement in which an electrostatic guard ring conductor is disposed between the stator input and output conductors and is terminated at external low impedance circuits to effectively prevent spurious coupling without affecting the normal or intended coupling effected via the rotor coupler bars. A novel cathode-follower circuit connection is employed in the related external circuitry to provide optimum source and/or load impedances to the various conductor elements.

Therefore, it is a principle object of the present invention to substantially reduce or eliminate direct capacitive coupling between the input and output patterns of the stator of a capacitive phase-shifting transducer without impairing the capacitive coupling via the rotor conductors upon which the accurate measurement of small physical displacement depends.

Another object of the invention is to provide novel and improved electrostatic shield means and related guard circuitry for phase-shifting capacitors.

Still another object of the invention is to provide novel impedance matching circuitry for use in connection with the driver conductors of a phase-shifting transducer.

Yet another object of the invention is to provide an improvement in the stability of electrostatic phase-shifting transducers and to provide a configuration which will obviate precise symmetry of complex conductor patterns necessary for prior devices and greatly simplify the balancing procedures therefore.

With these objects in view, the present invention comprises improvements in the apparatus described in the aforementioned patent applications, said improvements comprising the use of continuous guard ring conductor patterns disposed between certain of the stator conductor patterns, and ancillary electronic circuits for presenting the desired load impedances to the conductor circuits. This novel arrangement eliminates or at least substantially minimizes spurious electrostatic coupling and/or stray capacitive voltages.

The invention resides partly in the physical and electrical structures and inter-relationships embodied in the guard-ring conductor and the cathode-follower components of the system as herein specifically illustrated, but also embraces the concept of the system itself, considered as an integral whole, and independently of the structural details of its several parts. This invention will be understood more completely from the following detailed description, taken in conjunction with the drawings, in which.

Figure 1:
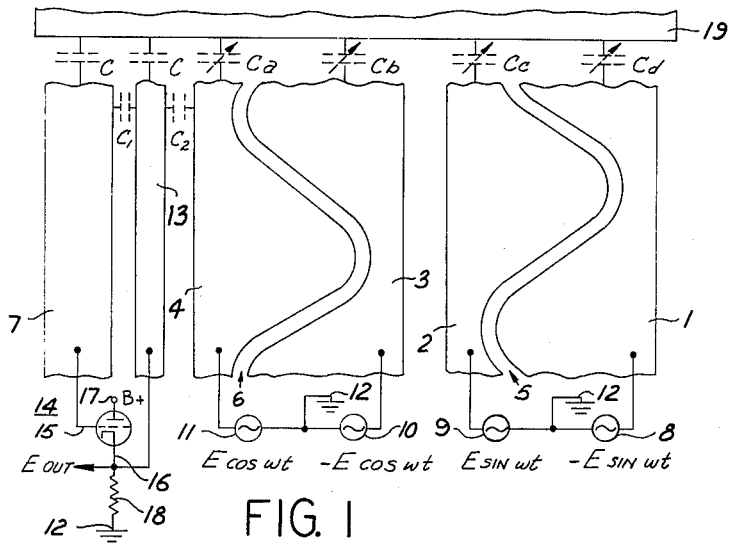
FIGURE 1 is a schematic diagram illustrating one form of the invention.

There is shown in FIGURE 1 a fragmentary schematic diagram of the active conductor elements of one form of phase-shifting transducer of the type to which the present invention may be applied. The stator comprises a relatively fixed dielectric supporting member to which are applied a plurality of conductor patterns comprising intermeshed sinusoidal patterns 1–2 and 3–4. These conductor patterns are separated by sinusoidally shaped insulating gaps 5 and 6. Heretofore, the electrical output from a transducer of this type has been obtained via a pair of output conductor rings, one of which is disposed adjacent conductor pattern 1 and the other disposed adjacent conductor 4. In accordance with the present invention, however, only a single output conductor 7 is employed. The rotor comprises a dielectric member which supports conductor coupler bar 1 which may be moved relative to stationary patterns 1–4 and 7 as a function of the mechanical input to the transducer. Alternating current signals are impressed on the driver patterns 1–4 from generator sources 8–11. The A.C. signal supplied to pattern 1 comprises $-E \sin \omega t$. The A.C. signal driving pattern 2 is of the form of $E \sin \omega t$. The A.C. signal supplied to conductor pattern 3 comprises $-E \cos \omega t$. The signal supplied to conductor pattern 4 comprises $E \cos \omega t$. Generators 8–11 are referenced to ground 12.

Movable conductor 19 electrostatically couples with the conductor patterns (1–4, 7 and 13) on the stator via capacitances C. The transducer resembles a phase-shifting capacitor supplied with a four-phase reference voltage. The variable capacitances of the transducer may be indicated as $C_a$, $C_b$, $C_c$ and $C_d$. The four-phase voltage source is provided by generators 8 through 11 which may be indicated by the following equations:

(1)
$$E_1 = -E \sin \omega t$$
$$E_2 = E \sin \omega t$$
$$E_3 = -E \cos \omega t$$
$$E_4 = E \cos \omega t$$

the variable capacitances are given by (2)
$$C_a = A + B \cos \phi$$
$$C_b = A + C \sin \phi$$
$$C_c = A - B \cos \phi$$
$$C_d = A - B \sin \phi$$

then solving for the output voltage $E_0$, results in an equation of the form:

(3)
$$E_0 = kE \sin (\omega t - \phi)$$

where $k$ is a constant. Thus, if $\phi$ in Equations 2 and 3 represent a mechanical input position, then we see from Equation 3 that the relative phase angle of $E_0$ is a measure of that mechanical position.

Looking just at the stator, it can be shown that the driver patterns and the output pattern resemble transmission lines having strap capacitances. The capacitance between these patterns may be indicated as $C_1$ and $C_2$. These stray capacitances are small, but are not negligible. With stray capacitive coupling, the voltages at all points on the output circuit are essentially in phase. Consequently, whatever current flows in the driver circuit flows in the same direction in the output pattern. Capacitive coupling can be limited by a guard ring or electrostatic screen that prevents the electric field from one conductor from reaching the other.

The guard-ring conductor 13, disposed between driver conductor 4 and output conductor 7, provides an electrostatic shield between the output conductor 7 and the driver patterns 1–4. That is, guard ring 13 becomes the local ground for stray capacitances $C_1$ and $C_2$.

The use of guard ring 13 obviates the requirement for a plurality of output rings placed symmetrically near the driver patterns as used heretofore.

A terminal load impedance for output conductor 7 is provided by a cathode follower employing vacuum tube triode 14. The output from conductor 7 is supplied to grid 15 and the guard-ring conductor is connected to the cathode 16. The plate 17 is connected to a source of operating potential (B+). The cathode load resistor 18 is referenced to ground 12.

With a cathode follower amplifier, the phase of the signal on the cathode 16 and the grid 15 is the same. The signal voltage drop across the cathode load resistor 18 also appears as input grid-to-cathode voltage. Thus, the cathode follower possesses 100% negative feedback and the potential across $C_1$ (between the output conductor 7 and the guard ring conductor 13) is zero, or nearly so. Also, the cathode 16, being a low impedance source, shields the grid 15. Spurious signals developed across the stray capacitances from the metallic driver patterns 1–4 to the output conductor 7, shown connected to the grid 15 of the cathode follower, are reduced to zero. The balancing procedure for the driver patterns 1–4 is simplified and more stable (using low impedance driving sources to the patterns).

Figure 2:
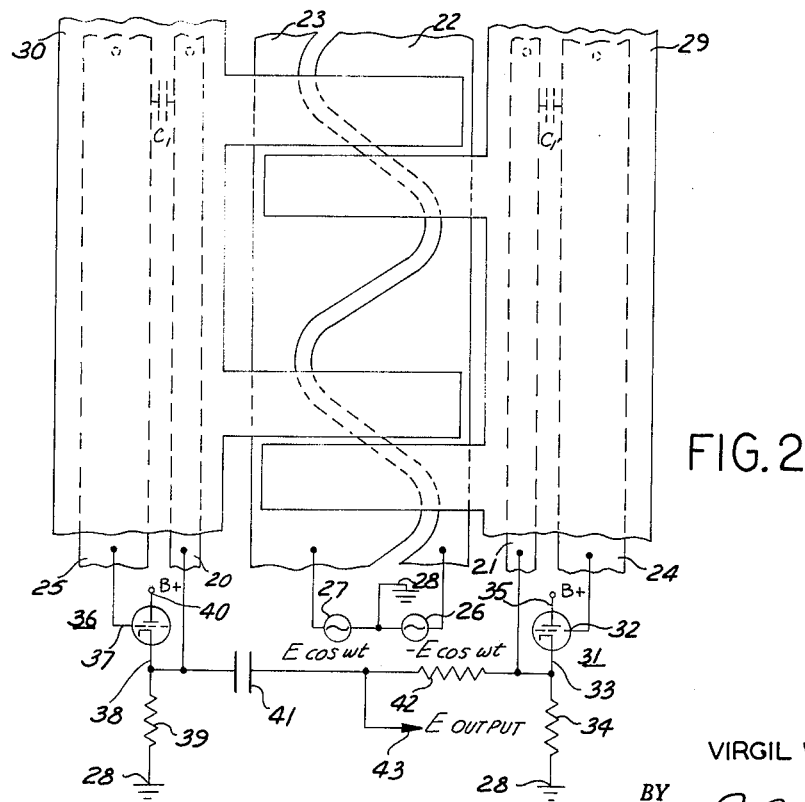
FIGURE 2 is a schematic diagram illustrating the invention as applied to an alternative form of precision measuring device.

There is shown in FIGURE 2 an alternative embodiment which is applicable to a phase shifting transducer of the general type disclosed in copending patent application Serial No. 121,852, referred to hereinabove. This embodiment differs from the prior art in that a pair of guard ring conductors 20 and 21 are disposed between the driven patterns 22 and 23 and the output conductors 24–25. In this form of the apparatus, the driven elements comprise a single pair of intermeshed sinusoidal conductor patterns 22 and 23. These are driven from a pair of generators 26 and 27, the first of which supplied $-E \cos \omega t$ and the second $E \cos \omega t$. These generators are referenced to ground via terminal 28. The output from the transducer is derived via output conductors 24 and 25. Energy from driven elements 22 and 23 is coupled into the output conductors 24 and 25 by means of overlying coupler patterns 29 and 30; these latter elements are carried on a relatively movable dielectric support member comprising the rotor.

As in the previous discussion directed to FIGURE 1, it should be understood that the terms rotor and stator are relative terms and serve only to identify the relatively movable element from the relatively fixed element and further, should not be construed as limited to a rotary phase-shifting transducer but are equally applicable to a rectilinearly translated phase-shifting transducer.

The ancillary circuitry for supplying a terminal load impedance for the output conductor patterns 24 and 25 is similar to that shown in the embodiment of FIGURE 1. It differs, however, in that two cathode followers are employed since there are two guard-ring conductors (20 and 21). The first cathode follower circuit comprises triode 31 having its grid 32 connected to output conductor 24, and its cathode 33 connected to guard ring 21. The output signal from conductor 24 appears across load impedance having one terminal referenced to ground 28. The plate 35 is connected to a source of operating potential (B+).

Similarly, the second cathode follower comprises triode 36 having its grid 37 connected to output conductor 25, and its cathode 38 connected to guard ring 20. The cathode 38 is also referenced to ground 28 via cathode impedance 39. The plate 40 is connected to a source of operating potential (B+).

The output signals appearing across load impedances 34 and 39 are combined in a post-pickup phase shifting network comprising capacitor 41 and resistor 42. The combined output appears at the junction 43 between resistor 42 and capacitor 41, and comprises a signal having the form:

$$E_0 = kE \cos (\omega t + 0 + \pi/2)$$

As in the first embodiment, the guard ring (20–21) is placed between the output conductor and the source of undesired cross-coupling signals. The cathode followers provide a low impedance source resulting in a zero charge (or nearly so) across stray capacitances $C_1$ and $C_1'$ which exist between conductors 20 and 30; and, 21 and 29, respectively.

The ratio of the unwanted signal in a communication circuit when the source of shielding is present to the same signal when the shield is absent is called the shield factor. A highly conducting shield will substantially terminate electrostatic fields. Commonly, conductor patterns such as 13, 20–21, etc., are made of copper, silver or gold. For frequencies of the upper audio range and above, such as commonly employed in connection with transducers of the type shown and described hereinabove, shield factors of the order of $10^{-4}$ are readily obtainable. Thus, it can be seen that the novel guard ring improvement disclosed herein comprises a significant advancement in the phase-shifting transducer art.

The disclosure given in connection with FIGURES 1 and 2 is intended to explain the fundamental arrangement and features of the invention and cathode-follower type amplifiers have been employed by way of example only. It will be obvious to those versed in the art that other forms of amplifiers such as operational amplifiers, where gain is unity and the output is in phase with the input, may be employed in lieu of the conventional cathode follower.

While there have been shown and described and pointed out the fundamental novel features of the invention as applied to preferred embodiments, it will be understood that various omissions, substitutions, and changes in the form and details of the devices illustrated and in their operation may be made by those versed in the art, without departing from the spirit of the invention.

What is claimed is:

1. In an electrostatic phase-shifting transducer having a flat input conductor strip continuously energized by a source of alternating current and a flat output conductor strip in coplanar relationship with said input conductor strip and flat coupler means in parallel overlying relationship with said input and output conductor strips and spaced therefrom by a fixed distance for selectively varying the phase of said alternating current between said input conductor and said output conductor strips, a flat guard conductor interposed in coplanar relationship between said input conductor strip and said output conductor strip, and a cathode follower, said guard conductor being connected directly to the cathode of said cathode follower and said output conductor being connected to the grid of said cathode follower, the signal at said grid being in phase with the signal at said cathode to prevent spurious voltages from developing across the stray capacitance therebetween thereby providing a phase shifter having a constant amplitude output.

2. In an electrostatic phase-shifting transducer having a plurality of flat coplanar conductors each supplied with an alternating current signal and flat output element in the same plane as said conductors and flat coupler means parallel to, and uniformly spaced apart from, said conductors and said output element for variably shifting the phase of said alternating current signal from said conductors into said output element as a function of a mechanical input, the improvement comprising a guard conductor comprising a highly conductive flat metallic strip interposed between said conductors and said output element and coplanar therewith, and low impedance circuit means coupling said output element with said metallic strip thereby terminating stray capacitances between said conductors and said output element thereby providing a phase shifter having a constant amplitude output.

3. In an electrostatic phase-shifting transducer having a pair of flat coplanar driven elements each supplied with phase displaced alternating current signals from a corresponding one of a pair of alternating current generators and a pair of flat output conductors coplanar with said driven elements and flat coupler means parallel with said driven elements and said output conductors and uniformly spaced apart therefrom, the improvement comprising first and second guard conductors coplanar with said driven elements and overlying a constant area of said coupler means, said first guard conductor comprising a highly conductive flat strip interposed between one of the output conductors of said pair and a corresponding one of said driven elements, said second guard conductor comprising a highly conductive flat strip interposed between the other of the output conductors and a corresponding one of said driven elements, whereby said guard conductors are terminated to provide local grounds for stray capacitances between said output conductors and said driven elements to prevent direct coupling of said phase displaced alternating current signals between said driven elements and said output elements and thereby providing a phase shifter having a constant amplitude output.

4. In an electrostatic phase-shifting transducer as defined in claim 3 wherein the termination for said guard conductors comprises first and second cathode followers, said first guard conductor being connected directly to the cathode of said first cathode follower and a corresponding one of said output conductors being connected to the grid of said first cathode follower, said second guard conductor being connected directly to the cathode of said second cathode follower and a corresponding one of said output conductors being connected to the grid of said second cathode follower.

5. A displacement measuring device comprising, a stator and a relatively movable rotor, a plurality of flat conducting elements extending in pairs along said stator each of said pairs of elements having a substantially sinusoidal dielectric space therebetween, means for imparting alternating current input signals to said elements which are phase displaced with respect to one another, a flat output conductor mounted on said stator, flat coupler conductor means movable with said rotor and having a uniformly spaced overlying parallel relationship and electrically coupled with said conducting elements and said output conductor to transfer said alternating current input signals from said conducting elements to said output conductor so as to change the phase of said signals in proportion to the mechanical displacement between said members, and a flat guard conductor disposed in coplanar relationship between said output conductor and said conducting elements, said guard conductor serving as a local ground for stray capacitances between said output conductor and said conducting elements.

References Cited by the Examiner

UNITED STATES PATENTS 2,802,178 8/1957 Shafer et al. _____ 324—61
2,978,638 4/1961 Wing et al. _____ 324—61 X

FOREIGN PATENTS 568,785 4/1945 Great Britain.

LLOYD McCOLLLUM, *Primary Examiner.*

WALTER L. CARLSON, *Examiner.*